United States Patent [19]

Lakey

[11] Patent Number: 4,949,846
[45] Date of Patent: Aug. 21, 1990

[54] PACKAGE END SEALING AND CUTTING METHOD AND APPARATUS

[76] Inventor: Lawrence D. Lakey, 4628 O'Connor Ct., Irving, Tex. 75062

[21] Appl. No.: 387,235

[22] Filed: Jul. 31, 1989

[51] Int. Cl.$^5$ .......................... B65B 7/06; B65B 9/06; B65B 51/16
[52] U.S. Cl. ...................................... 206/484; 53/373; 53/450; 53/463; 53/479; 53/550; 156/251; 156/515
[58] Field of Search .................. 53/373, 450, 463, 477, 53/479, 550, 451, 551, 552; 156/251, 515; 206/484; 383/94

[56] References Cited

U.S. PATENT DOCUMENTS

| | | | |
|---|---|---|---|
| 2,546,721 | 3/1951 | Campbell | 53/450 X |
| 3,581,457 | 6/1971 | Gerlach | 53/450 |
| 4,106,262 | 8/1978 | Aterianus | 53/450 |
| 4,183,964 | 1/1980 | Vinokur | 53/450 X |
| 4,455,808 | 6/1984 | Netzhammer | 53/373 |
| 4,506,488 | 3/1985 | Matt et al. | 53/55 |
| 4,525,977 | 7/1985 | Matt | 53/55 |
| 4,574,566 | 3/1986 | Eaves et al. | 53/450 |
| 4,768,411 | 9/1988 | Su | 53/373 X |

Primary Examiner—Robert L. Spruill
Assistant Examiner—Linda B. Johnson
Attorney, Agent, or Firm—Hubbard, Thurman, Turner, Tucker & Harris

[57] ABSTRACT

The continuously formed wrapping material tube traversing a horizontal wrapping machine, and containing articles to be wrapped therein, is sequentially passed between a first pair of opposed, counter-rotating heat sealing bar sets, and then between a second pair of opposed, counter-rotating combination heat sealing and cutting bar sets, to heat seal and cut spaced apart longitudinal sections of the tube, each positioned between an adjacent pair of articles, to form individual, article-containing packages. As each of these longitudinal tube sections passes through the first bar set, corrugated outer ends of two bars therein mesh to compress and heat seal the tube section along a corrugated heat seal area whose ridges and valleys extend transversely to the tube length. As the heat sealed tube section passes through the second bar set, corrugations in the outer ends of two bars thereof precisely mesh with each other, and with the previously formed tube section corrugations, to further heat seal the tube section along its corrugations. Complementary knife and anvil sections carried by these latter two bars transversely cut the tube section simultaneously with this secondary heat sealing operation. By virtue of this dual sealing operation, highly efficient end sealing of the resulting packages is achieved. Precise rotational control of the two rotating bar sets is achieved using a synchronized, anti-backlash gear drive system.

20 Claims, 2 Drawing Sheets

PACKAGE END SEALING AND CUTTING METHOD AND APPARATUS

BACKGROUND OF THE INVENTION

The present invention relates generally to article wrapping apparatus and, in a preferred embodiment thereof, provides improved apparatus and methods for sealing and cutting apart spaced longitudinal sections of a wrapping material tube exiting, for example, a horizontal wrapping machine to form individual, sealed packages each containing one or more articles previously loaded thereinto by an article infeed portion of the machine.

Horizontal wrapping machines of various types are well known in the material handling art and typically comprise a forming box structure through which an elongated sheet of flexible wrapping material is drawn. The forming box is operative to continuously form from the sheet a forwardly moving tube having a rearwardly disposed open inlet end, and a laterally outwardly projecting "fin" defined by drawn-together side edge portions of the sheet. An article infeed system is used to sequentially insert articles to be wrapped into the open tube inlet end. The inserted articles, in a longitudinally spaced array, are then carried within the wrapping material tube as it forwardly exits the forming box. The individual articles (or associated groups of articles, as the case may be) forwardly transported within the tube are spaced apart by spaced longitudinal sections of the tube.

As the article-containing tube exits the forming box, its fin portion is drawn between, and heat sealed, by an opposed pair of counter-rotating heat sealing wheels. The sealed fin is then passed through a foldover station which operates to fold the sealed fin over onto an adjacent portion of the tube. The tube, with its sealed and folded-over fin, is then passed through a cutting and sealing station which operates to compress, heat seal and transversely cut the longitudinal tube sections between longitudinally adjacent article pairs or sets to form individual, article-containing packages with sealed opposite ends.

In conventional wrapping machines, this final sealing and cutting process is typically performed by passing the tube through a pair of opposed, counter-rotating cutting and sealing bar structures which intermittently mesh at radially outer ends thereof to simultaneously compress, heat seal and cut each longitudinal tube section as it passes through the cutting and sealing station. To effect this process, one of the intermittently meshing outer bar ends is provided with a cutting knife interposed between first and second corrugated heat sealing sections, while the other end of the other bar is provided with an anvil portion interposed between first and second corrugated heat sealing sections which are mirror images of the corresponding corrugations on the knife-carrying bar.

As a given longitudinal tube section passes between the rotating bars, the outer bar ends cooperate to sequentially mesh their first corrugated sections to form a corrugated heat seal along a lead portion of the tube section, force the cutting knife through the tube section and against the anvil to cut away the heat sealed tube section from the balance of the tube section, and then mesh the second corrugated bar end portions to form a corrugated heat seal along the balance of the longitudinal tube section.

In many conventional wrapping machines, the outer ends of these combination sealing and cutting bars are configured in a manner such that the ridges and valleys of the corrugated heat seal areas at the opposite ends of the resulting packages extend parallel to the lengths thereof (i.e., transversely to the end cut lines). Due to the relatively high linear travel rate of the wrapping material tube through the cutting and sealing station of the wrapping machine, the outer sealing and cutting bar ends operatively contact the spaced longitudinal bag sections only for a brief instant. Accordingly, it is not an uncommon occurrence for imperfect seals to be formed on the package ends, and one or more longitudinal leakage paths to remain between the package interior and one or both outer ends of the package.

For many packaged articles, minor remaining package end leak passages are not critical. However, as to other articles, such as medical products for example, even relatively minor package end leakage paths are highly undesirable. To this end, it is now common practice to configure the meshing outer ends of the combination sealing and cutting bars in a manner such that the ridges and valleys of the corrugated package end seal areas extend transversely to the package lengths. While this transverse sealing scheme represents an improvement over longitudinally extending seal corrugations, minor package end leaks can still, and often do, occur.

In view of the foregoing, it can be seen that a need exists for improved apparatus, and associated methods, for producing still better end seals on individual packages discharged from horizontal wrapping machines and the like. It is accordingly an object of the present invention to provide such improved apparatus and methods.

SUMMARY OF THE INVENTION

In carrying out principles of the present invention, in accordance with a preferred embodiment thereof, substantially improved end seals are formed on the opposite ends of the individual, article-containing packages discharged from a horizontal wrapping machine. In general, the improved package end seals are formed by heat sealing longitudinally spaced sections of the wrapping material tube traversing the machine, and then performing a secondary heat sealing operation on each previously sealed tube section as it is being transversely cut to separate another individual package from the balance of the wrapping material tube.

To perform the first heat sealing operation, and the subsequent secondary heat sealing/transverse cutting operation, on each of the spaced longitudinal tube sections, each tube section is first passed through an initial heat sealing station comprising a first pair of opposed, counter-rotating heat sealing bar sets. As the longitudinal tube section passes through this station, corrugated, heated outer ends of two opposing, counter-rotating bars therein mesh with each other, compress the tube section therebetween, and form along the entire length of the tube section a corrugated heat seal area whose alternating ridges and valleys extend transversely to the length of the tube.

This corrugated, initially sealed tube section is then passed through a secondary sealing/cutting station comprising a second pair of opposed, counter-rotating heat sealing bar sets. As the corrugated and initially heat sealed tube section passes through this second station, the corrugated, heated ends of two opposing, counter-rotating bars therein mesh with each other. The end corrugations in these latter two bars and are thus identical in configuration to the corrugations in the tube section. The rotation of the second station bars is precisely correlated to the rotation of the first station bars, by synchronized, antiblacklash gear drive means operatively interconnected between the two stations, in a manner such that as the second station bar end corrugations mesh they precisely enter and conform to the tube section corrugations passing through the second station.

Entry of these second bar corrugations into the tube section corrugations further heat seals the tube section corrugation along its perviously formed corrugations—providing, in effect, twice-sealed opposite ends in the resulting individual packages. As the second station bars are performing this unique redundant sealing function, cooperating knife and anvil means carried by the second station bars simultaneously cut transversely through a longitudinally central portion of the tube section to sever the completed package from the balance of the wrapping material tube.

The result of this sequential primary sealing—secondary sealing/cutting operation is greatly improved end seals on the resulting individual packages which are accordingly rendered for more suitable then conventionally end-sealed packages for enclosing articles, such as medical instruments for example, which must be very tightly sealed off from the surrounding atmosphere until their enclosing package is opened.

DETAILED DESCRIPTION

Figures 1, 2:
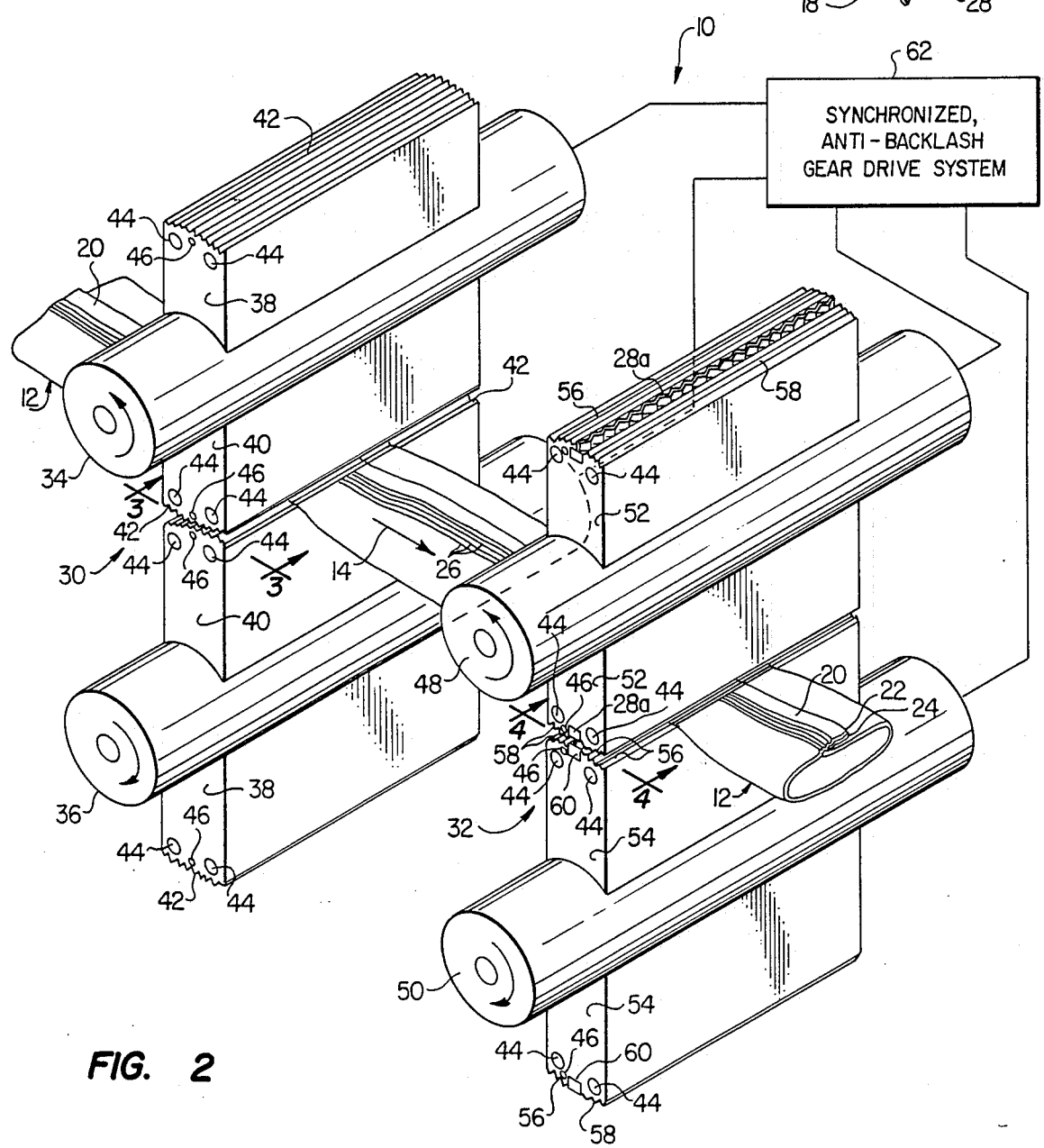
FIG. 1 is a perspective view of an individual package formed from a continuously formed wrapping material tube drawn through a horizontal article wrapping machine.
FIG. 2 is a perspective view of a portion of the wrapping material tube being passed through a unique cutting and sealing station which is incorporated into the wrapping machine, embodies principles of the present invention and is operative to crimp seal and cut longitudinally spaced sections of the tube to form individual packages such as that illustrated in FIG. 1.

Referring initially to FIGS. 1 and 2, the present invention provides improved package end sealing and cutting apparatus 10 which may be easily incorporated in a horizontal article wrapping machine (not illustrated) which is operative to form, from a continuous wrapping material tube 12 being drawn through the machine in the longitudinally forward direction indicated by the arrow 14, a series of individual, article-containing packages 16. As later described herein, the apparatus 10 uniquely functions to provide substantially improved opposite end seals 18 on each of the packages 16.

Figure 5:
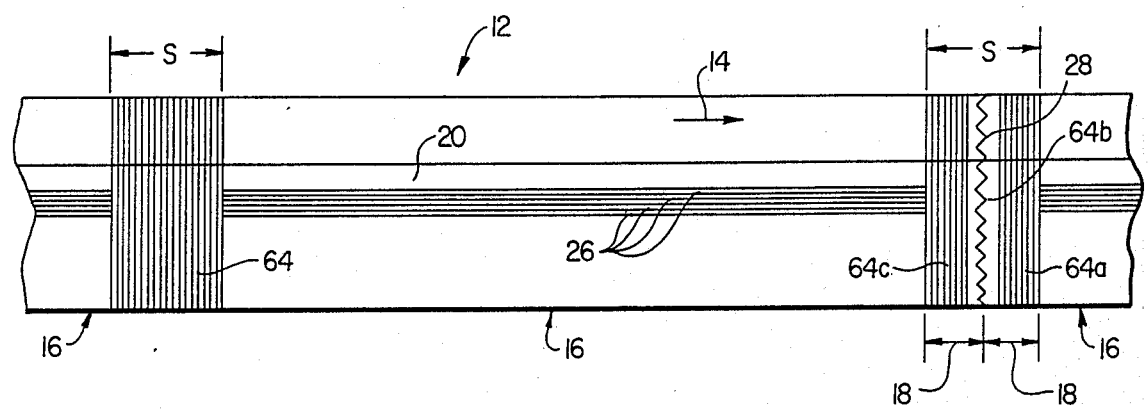
FIG. 5 is a top plan view of the FIG. 1 tube portion, with the rotating bar structures removed, and illustrates the unique end seals formed by the bar structures on each individual package exiting the wrapping machine.

The wrapping material tube 12 moving forwardly through the sealing and cutting apparatus 10 has a folded-over fin 20 defined by adjacent side edge portions 22, 24 of the elonagated wrapping material sheet used to form the tube 12. By conventional means, the side edge portions 22, 24 are secured to one another by a series of heat seal lines 26 extending along the length of the fin 20. As illustrated in FIG. 5, the forwardly moving tube 12 has a spaced series of longitudinal sections S thereon which separate the individual package portions 16 of the tube from one another, each such package portion containing one or more articles previously inserted into the tube by an infeed portion of the wrapping machine. In a manner subsequently described, a serrated cut line 28 is transversely formed across each longitudinal tube section S to separate the abutting package ends 18 defined thereby.

Figure 3:
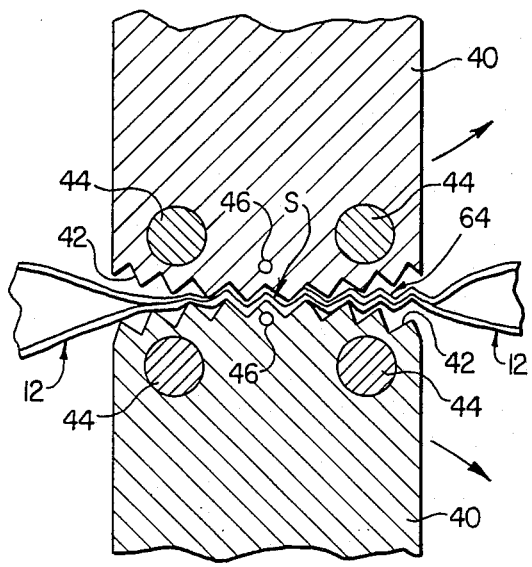
FIG. 3 is an enlarged scale cross-sectional view through the tube, and a pair of counter-rotating sealing bar structures operating thereon, taken along line 3—3 of FIG. 2.
Figure 4:
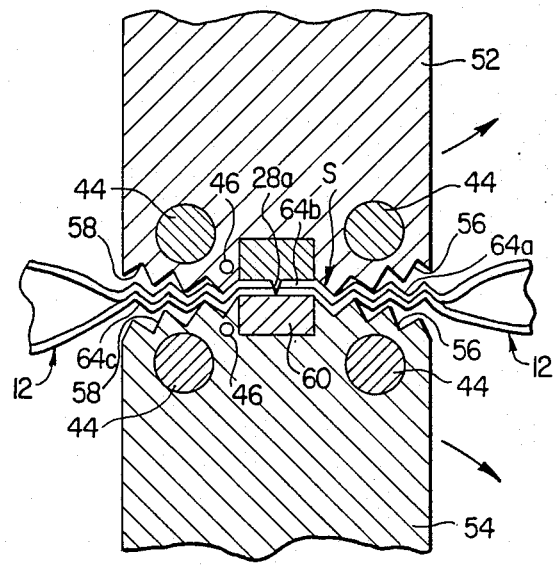
FIG. 4 is an enlarged scale cross-sectional view through a second portion of the tube, and a pair of counter-rotating sealing and cutting bars structures operating thereon, taken along line 4—4 of FIG. 2.

Referring to FIGS. 2-4, the appratus 10 includes an initial heat sealing station 30 positioned for forward movement of the tube 12 therethrough, and a cutting and secondary heat sealing station 32 spaced forwardly of the station 30 and also positioned for forward movement of the tube 12 therethough.

The initial heat sealing station 30 includes an upper support shaft 34 positioned above and extending transversely to the tube 12, and a lower support shaft 36 which is positioned below the tube 12, extends transversely thereto, and is horizonatally aligned with the upper support shaft 34. A diametrically opposed pair of initial sealing bar members 38 and 40 are secured to longitudinally central portions of the shafts 34 and 36 for rotation therewith in opposite directions as indicated in FIG. 2, and project laterally outwardly therefrom.

The outer side edge of each of the sealing bars 38 and 40 is radiused and has formed thereon a corrugated area 42, the ridges and valleys of which extend parallel to the length of the support shafts 34 and 36. The four corrugated areas 42 are identical in cross-section, with the corrugated areas 42 on the bars 40 being mirror images of one another, and the corrugated areas 42 on the bars 38 also being mirror images of one another. As illustrated, the support shafts 34, 36 may be counter-rotated to alternately bring the bar sets 38 and 40 into opposing relationship with one another such that their corrugated areas 42 mesh with a portion of the tube 12 interposed therebetween. Outer side edge portions of each of the bars 38 and 40 are heated by means of a pair of conventional electric heating rod elements 44 inserted therein. Additionally, a conventional thermocouple element 46 is inserted into each of the four outer rod side edge portions to sense, and provide for control of, the temperatures thereof.

The cutting and secondary heat sealing station 32 includes an upper support shaft 34 positioned above and extending transversely to the tube 12, and a lower support shaft 50 positioned below the tube 12, extending transversely thereto, and horizontally aligned with the upper support shaft 48. Secured to a longitudinally central portion of the upper support shaft 48, for counterclockwise rotation therewith, are a diametrically opposed pair of cutting and secondary sealing bar members 52 which project laterally outwardly from the shaft 48. In a similar fashion, a pair of diametrically opposed cutting and secondary sealing bar members 54 are secured to a longitudinally central portion of the lower support shaft 50, for clockwise rotation therewith, and project laterally outwardly therefrom.

The outer side edges of the upper bars 52 are radiused and have formed thereon laterally spaced apart corrugated areas 56 and 58, the ridges and valleys of which extend parallel to the length of the upper support shaft 48. The corrugated areas 56 and 58 are cross-sectionally identical to one another, and are also cross-sectionally identical to the corrugated areas 42 on the initial heat sealing station bars 38 and 40. Secured between the spaced corrugation areas 56 and 58 one each of the outer side edges of the bars 52 is a serrated cutting blade element $28_a$ which, in a manner subsequently described, is utilized to form the transverse cut line 28 illustrated in FIG. 5.

The outer side edges of the lower bars 54 are similarly provided with laterally spaced corrugated areas 56 and 58 which are cross-sectionally identical with, and mirror images of, their counterpart corrugated areas 56 and 58 on the upper bar 52. Secured to the outer side edges of the lower bars 54, between their corrugated areas 56 and 58, are anvil members 60. Each outer side edge portion of the upper and lower bars 52 and 54 is heated by means of a pair of conventional electric heating rod elements 44 inserted therein, and conventional thermocouple elements 46 are also operatively inserted into these outer side edge portions.

As illustrated, the upper and lower support shafts 48 and 50 may be counter-rotated to intermittently bring the radiused outer side edges of opposing bar sets 52, 54 into close adjacency with one another with a portion of the tube 12 interposed therebetween. In a manner subsequently described, this sequentially causes the facing corrugation portions 56 to mesh on opposite sides of the interposed tube portion, a cutting blade $28_a$ to be forced through the interposed tube portion and brought into engagement with its opposing anvil 60, and then cause the opposing corrugated areas 58 to mesh on opposite sides of the interposed tube portion.

Still referring to FIGS. 2-4, a synchronized, anti-backlash gear drive system 62, of conventional construction and operation, is operatively connected to the support shafts 34, 36, 48 and 50 to drivingly rotate such shafts in the directions indicated, and to precisely synchronize their rotations in a manner such that each successive longitudinal tube section S is acted upon by opposing bar sets in the following manner as each longitudinal tube section sequentially passes through the initial heat sealing station 30 and the cutting and secondary heat sealing station 32.

As a given longitudinal tube section S passes through the station 30, the corrugated areas 42 of the upper and lower bars 40 (or of the upper and lower bars 38 as the case may be) are caused to mesh as the tube section S passes therebetween (see FIG. 3). The meshing of these two opposed, heated corrugation areas 42 flattens the longitudinal tube section S and forms thereon a corrugated, initially heat sealed area 64 (see also FIG. 5), the ridges and valleys of which extend transversely to the length of the tube 12. The cross-section of this corrugated, initially heat sealed area 64 is, of course, cross-sectionally identical to the opposed, meshing corrugated areas 42 which created it.

As the corrugated, initially heat sealed area 64 on the longitudinal tube section S is subsequently passed through the cutting and secondary heat sealing station 32, the outer side edges of a counter-rotating bar pair 52, 54 are brought into close adjacency with one another with the now corrugated and initially heat sealed tube section S interposed therebetween as illustrated in FIG. 4. As these outer side edges of the opposing bar set 52, 54 are rotated past one another, the opposing corrugated areas 56 (which are cross-sectionally identical to the corrugated tube section area 64) congruently and matingly enter a front portion $64_a$ of the corrugated tube section area 64, from opposite sides thereof, and form a secondary heat seal thereon which supplements, and has a configuration substantially identical to, the initial heat seal thereon previously applied at the station 30.

Upon further counter-rotation of the opposed bar set 52, 54, the cutting blade $28_a$ illustrated in FIG. 4 is forced through a longitudinally central portion $64_b$ of the corrugated area 64, and brought into engagement with its associated anvil 60, to form the transverse, serrated cut line 28 through the tube 12 and separate an individual package 16 (FIG. 1) from the balance of the tube just after forming one of the package's doubly sealed ends 18.

Upon still further counter-rotation of the opposed bar set 52, 54, the opposing corrugated portions 58 on their outer side edges are caused to congruently and matingly enter a rear portion $64_c$ of the corrugated area 64, from opposite sides thereof, and from thereon a secondary heat seal which supplements, and has a configuration substantially identical to, the initial heat seal previously formed thereon at the station 30. This also forms the doubly sealed leading edge portion of another package 16, the leading and trailing sealed edge portions of longitudinally adjacent individual packages being defined by the corrugated, initially heat sealed area 64 and separated from one another by the serrated cut line 28. Subsequent to the meshing of the opposed corrugated areas 58, and their mating entry into the reat portion $64_c$ of the corrugated area 64, the facing outer side edges of the bar set 52, 54 illustrated in FIG. 4 are rotated away from the tube section S previously interposed therebetween, and the simultaneous cutting and secondary sealing operation is performed on the next successive tube section S by the other set of bars 52, 54 illustrated in FIG. 2 as their outer side edges are counter-rotated into close adjacency on opposite sides of the next tube section S.

In the manner just described, the apparatus 10 of the present invention uniquely forms, on the opposite ends of each of the individual packages 16 exiting the horizontal wrapping machine a corrugated, double heat sealed area defined by an initial corrugated heat seal area upon which, in a precisely identical mating configuration, a secondary heat seal is formed. Because of these configurationally identical first and second heat seals, the opposite ends of each individual package 16 are essentially leak-free, despite the high, continuous longitudinal travel rate of the tube 12 through conventional horizontal wrapping machines. This essentially leak-free end sealing of the individual packages 16 renders them suitable for enclosing articles, such as medical instruments for example, which must be tightly isolated from the surrounding atmosphere until their package is opened. The apparatus 10 represents a relative low cost addition to conventional wrapping machines, and greatly increases their package-end-sealing efficiency.

While it is preferred that the doubly heat sealed opposite ends 18 of the individual, article-containing packages 16 are of the transversely corrugated configuration illustrated herein, it will be appreciated by those skilled in the wrapping art that other double indentically positioned and configured heat seal areas could be utilized if desired. As but some examples, longitudinally extending corrugations, criss-crossed ridge patterns, or even essentially flat heat seal patterns could be found on the package ends using the unique double heat sealing methods of the present invention.

The foregoing detailed description is to be clearly understood as being given by way of illustration and example only, the spirit and scope of the present invention being limited solely by the appended claims.

What is claimed is:

1. A method of forming a series of packages, each having tightly sealed, essentially leak-free opposite ends, from a wrapping material tube being longitudinally moved in a first direction and having a series of longitudinal sections thereon mutually spaced apart in said first direction, said method comprising the steps of:

forming on each successive longitudinal tube section a corrugated, initially heat sealed area defining abutting sealed ends of two adjacent package portions of the tube; and subsequently inserting heated corrugations of opposed heat seal/cutting members matingly into corrugations on successive ones of said initially heat sealed areas to further heat seal each initially heat sealed area along substantially its entire extent, and cut through the abutting, sealed package ends defined thereby, whereby the resulting individual sealed packages are provided at their closed opposite ends with corrugated seal areas in which the corrugations are doubly heat sealed along substantially their entire lenghts.

2. A package formed by the method of claim 1.

3. The method of claim 1 wherein:

said step of forming on each successive longitudinal section a corrugated, initially heat sealed area is performed by utilizing counter-rotating initial heat sealing members positioned for passage of the tube therebetween, and having heated corrugated areas thereon, and intermittently bringing said heated corrugated areas into close adjacency with one another on opposite sides of each successive longitudinal tube section.

4. A package formed by the method of claim 3.

5. The method of claim 1 wherein:

said step of subsequently inserting heated corrugations is performed utilizing counter-rotating heat seal/cutting members positioned on opposite sides of the tube and having outer portions intermittently rotatable into close adjacency with one another, each of said outer portions having first and second spaced apart corrugated portions thereon, and cooperating cutting means, carried between said first and second corrugated portions, for cutting through the abutting, sealed package ends.

6. A package formed by the method of claim 5.

7. Apparatus for sealing and cutting spaced longitudinal sections of a wrapping material tube being longitudinally moved in a first direction to form a series of individual, end-sealed packages from the tube, said apparatus comprising:

initial sealing means, positioned for successive passage therethrough of each longitudinal tube section, for flattening each successive longitudinal tube section and forming thereon a corrugated, initially heat sealed area;

secondary sealing means, spaced apart from said initial sealing means in said first direction and positioned for successive passage therethrough of each corrugated, initially heat sealed longitudinal tube section, for entering and precisely conforming to corrugations in the initially heat sealed longitudinal tube section areas and forming thereon a secondary heat seal which supplements and conforms in shape and orientation to the prior heat seal formed thereon by said initial sealing means; and cutting means, carried by said secondary sealing means, for cutting each corrugated longitudinal tube section, during formation thereon of its secondary heat seal, to successively form individual end-sealed packages.

8. The apparatus of claim 7 wherein:

the ridges and valleys of the corrugations in each of said corrugated, initially heat sealed areas extend transversely to the length of the tube.

9. The apparatus of claim 8 wherein:

said cutting means are operative to transversely cut each corrugated longitudinal tube section along a serrated cut line.

10. The apparatus of claim 7 wherein:

said initial sealing means include at least one pair of heated, counter-rotating heat sealing members positioned on opposite sides of the tube and having corrugated outer portions intermittently rotatable into meshing engagement from opposite sides of successive ones of said longitudinal tube sections.

11. The apparatus of claim 7 wherein:

said secondary sealing means include at least one pair of heated counter-rotating heat sealing members positioned on opposite sides of the tube and having outer portions intermittently rotatable into close adjacency with one another on opposite sides of successive ones of said corrugated, initially heat sealed areas of said longitudinal tube sections, each of said outer portions having spaced apart first and second corrugated areas, and said cutting means include cooperatively interengageable cutting means, carried by said at least one pair of heated, counter-rotating heat sealing members between said first and second corrugated areas formed thereon.

12. Apparatus for sealing and cutting spaced longitudinal sections of a wrapping material tube being longitudinally forwardly moved to form a series of individual end-sealed packages from the tube, said apparatus comprising:

an initial heat sealing station including at least one pair of heated initial sealing members having corrugated portions and being positioned on opposite sides of the tube, said at least one pair of heated initial sealing members being rotationally drivable in opposite directions to intermittently mesh the corrugated portions thereon with a tube portion interposed therebetween;

a cutting/secondary heat sealing station spaced forwardly apart from said initial heat sealing station and including at least one pair of heated cutting and secondary sealing members each carrying cooperative cutting means interposed between first and second corrugated portions thereon, said at least one pair of heated cutting and secondary sealing members being rotationally drivable in opposite directions to intermittently bring the corrugated portions thereon into close adjacency, with a tube portion interposed therebetween, to sequentially mesh opposing first corrugated portions, engage said cooperative cutting means to cut the tube, and then mesh opposing second corrugated portions, the corrugations in said first and second corrugated portions of said at least one pair of heated cutting and secondary sealing members having configurations, and orientations relative to the length of the moving tube, essentially identical to the configurations, and orientations relative to the length of the moving tube, of the corrugations on said at least one pair of heated initial sealing members; and drive means for operatively rotating said at least one pair of heated initial sealing members and said at least one pair of heated cutting and secondary sealing members, and for precisely synchronizing the rotations thereof, in a manner such that said longitudinal tube sections are successively positioned between a pair of said heated initial sealing members as their corrugations mesh, so that the meshing pair of heated initial sealing members flatten the longitudinal tube section positioned therebetween and form thereon a corrugated, initially heat sealed area, and the corrugated, initially heat sealed areas of said longitudinal tube sections are successively interposed between a pair of said heated cutting and secondary sealing members as their corrugated portions are rotated into close adjacency in a manner such that, sequentially:

said first corrugated portions of the pair of heated cutting and secondary sealing members matingly enter a first portion of the corrugations on the interposed, initially heat sealed area and form thereon a secondary heat seal, said cooperative cutting means on the pair of heated cutting and secondary sealing members are brought into engagement to cut through the interposed, initially heat sealed area, and said second corrugated portions of the pair of heated cutting and secondary sealing members matingly enter a second portion of the corrugations on the interposed, initially heat sealed area and form thereon a secondary heat seal.

13. The apparatus of claim 12 wherein:
the ridges and valleys of each of said corrugated, initially heat sealed areas extend transversely to the length of the tube.

14. the apparatus of claim 13 wherein:
said cooperative cutting means are operative to cut through each corrugated, initially heat sealed area along a serrated cut line extending generally transversely to the length of the tube.

15. A method of forming a series of packages, each having tightly sealed, essentially leak-free opposite ends, from a wrapping material tube being longitudinally moved in a first direction and having a series of longitudinal sections thereon mutually spaced apart in said first direction, said method comprising the steps of:

forming on each successive longitudinal tube section an initially heat sealed area having a predetermined configuration and defining abutting sealed ends of two adjacent package portions of the tube; and subsequently forming on each initially heat sealed area a secondary heat sealed area, the secondary heat seal area being essentially identical in configuration to and congruent with a major portion of the initially heat sealed area, while cutting through the abutting, sealed package ends defined by the initially heat sealed area whereby the opposite ends of the resulting individual packages area doubly heat sealed along essentially the entire initially heat sealed areas thereon.

16. The method of claim 15 wherein:
said step of forming on each successive longitudinal tube section an initially heat sealed area includes the step of corrugating each successive longitudinal tube section.

17. The method of claim 16 wherein:
said step of corrugating each successive longitudinal tube section is performed in a manner such that the lengths of the ridges and valleys in each corrugated, initially heat sealed longitudinal tube section extend generally transversely to the length of the tube.

18. A package formed by the method of claim 15.
19. A package formed by the method of claim 16.
20. A package formed by the method of claim 17.

* * * * *

UNITED STATES PATENT AND TRADEMARK OFFICE
CERTIFICATE OF CORRECTION

PATENT NO. : 4,949,846

DATED : Aug. 21, 1990

INVENTOR(S) : Lawrence D. Lakey

It is certified that error appears in the above-identified patent and that said Letters Patent is hereby corrected as shown below:

Col. 2, line 23, change "indesirable" to --undesirable--.

Col. 3, line 3, insert --are configured identically to those in the first station bars-- after "latter two bars".

Col. 3, line 7, change "antiblacklash" to --antibacklash--.

Col. 3, line 41, insert --,-- after "invention".

Col. 4, line 20, change "appratus" to --apparatus--.

Col. 5, line 11, change "one each" to --on each--.

Col. 6, line 3, insert --facing-- after "these".

Col. 6, line 36, change "reat portion" to --rear portion--.

Col. 6, line 63, change "package-end-sealing" to --package end-sealing--.

Col. 7, line 32, change "lenghts" to --lengths--.

Col. 10, line 4, change "the" to --The--.

Col. 10, line 26, change "area doubly" to --are doubly--.

Signed and Sealed this

Third Day of November, 1992

Attest:

DOUGLAS B. COMER

Attesting Officer     Acting Commissioner of Patents and Trademarks